(12) United States Patent
Son

(10) Patent No.: US 10,926,749 B2
(45) Date of Patent: Feb. 23, 2021

(54) ELECTRONIC BRAKE SYSTEM AND CONTROL METHOD THEREOF

(71) Applicant: MANDO CORPORATION, Pyeongtaek-si (KR)

(72) Inventor: Joo-Hee Son, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 356 days.

(21) Appl. No.: 15/932,181

(22) Filed: Feb. 16, 2018

(65) Prior Publication Data
US 2018/0229707 A1 Aug. 16, 2018

(30) Foreign Application Priority Data
Feb. 16, 2017 (KR) .................. 10-2017-0021047

(51) Int. Cl.
| | |
|---|---|
| B60T 13/68 | (2006.01) |
| B60T 13/74 | (2006.01) |
| B60T 8/40 | (2006.01) |
| B60T 8/00 | (2006.01) |

(52) U.S. Cl.
CPC .............. *B60T 13/686* (2013.01); *B60T 8/00* (2013.01); *B60T 8/4081* (2013.01); *B60T 13/745* (2013.01); *B60T 2270/10* (2013.01); *B60T 2270/82* (2013.01); *B60T 2270/88* (2013.01)

(58) Field of Classification Search
None
See application file for complete search history.

(56) References Cited

U.S. PATENT DOCUMENTS

| | | | | |
|---|---|---|---|---|
| 2012/0038209 A1* | 2/2012 | Yamamoto | .............. | B60T 17/06 303/9.63 |
| 2015/0298664 A1* | 10/2015 | Nimura | ..................... | B60T 8/36 701/70 |
| 2019/0315322 A1* | 10/2019 | Goto | ........................ | B60T 8/171 |

* cited by examiner

*Primary Examiner* — Lail A Kleinman
(74) *Attorney, Agent, or Firm* — Morgan, Lewis & Bockius LLP

(57) ABSTRACT

Disclosed herein is an electronic brake system. An electronic brake system according to an embodiment of the present disclosure, which is an electronic brake system including a pedal displacement sensor configured to sense displacement of a brake pedal according to a pedal effort of the brake pedal, a hydraulic pressure supply device configured to generate a hydraulic pressure using a rotational force of a motor operated by an electrical signal output from the pedal displacement sensor, and a hydraulic control unit configured to transmit a hydraulic pressure discharged from the hydraulic pressure supply device to wheel cylinders provided on respective wheels, includes a plurality of valves configured to adjust the hydraulic pressures transmitted to the wheel cylinders, a pressure measurer configured to measure hydraulic pressures of the wheel cylinders and a hydraulic pressure of the hydraulic control unit, and a controller configured to control an electromagnetic force of the valve when a difference between the measured hydraulic pressure of the wheel cylinder and the measured hydraulic pressure of the hydraulic control unit is more than a preset first threshold value during an anti-lock braking system (ABS) operation.

14 Claims, 5 Drawing Sheets

ELECTRONIC BRAKE SYSTEM AND CONTROL METHOD THEREOF

CROSS-REFERENCE TO RELATED APPLICATION

This application claims the benefit of Korean Patent Application No. 2017-0021047, filed on Feb. 16, 2017 in the Korean Intellectual Property Office, the disclosure of which is incorporated herein by reference.

BACKGROUND

1. Field

Embodiments of the present disclosure relate to an electronic brake system, and more particularly, to an electronic brake system for reducing operating noise and vibration during an anti-lock braking system (ABS) operation, and a control method thereof.

2. Description of the Related Art

A vehicle is essentially equipped with a brake system for braking. Recently, various types of systems for obtaining a more powerful and stable braking force are being proposed.

Examples of the brake system include an anti-lock braking system (ABS) which prevents slippage of wheels during braking, a brake traction control system (BTCS) which prevents slippage of driving wheels during sudden unintended acceleration or rapid acceleration of a vehicle, an electronic stability control system (ESC) which stably maintains a driving state of a vehicle by controlling a brake hydraulic pressure by combining the ABS and the BTCS, and the like.

Generally, an electronic brake system includes a hydraulic pressure supply device, which receives a driver's braking intention as an electrical signal from a pedal displacement sensor for sensing displacement of a brake pedal and supplies a pressure to wheel cylinders, when the driver depresses the brake pedal.

Further, the hydraulic pressure supply device is configured to allow a motor to operate according to a pedal effort of a brake pedal and generate a braking pressure. In this case, the braking pressure is generated by converting a rotational force of the motor into a straight-line movement and pressing a piston.

Specifically, when a hydraulic pressure is generated by the motor, positions of pistons inside chambers mounted on wheels are adjusted by the motor to adjust a liquid measure using a constant relationship between a braking pressure generated in a caliper and a liquid measure introduced into the caliper, and thus the braking pressure may be controlled.

Further, when ABS, ESC, or BTCS control is performed, a torque of the motor may be adjusted and wheel valves may be controlled to obtain a rapid control response.

In this case, when the ABS control is performed, the hydraulic pressure to the wheel cylinders is controlled according to on/off control of the wheel valves. That is, in a normal state in which the hydraulic pressure at the wheel cylinder side acts, the valve disconnects a flow path at an accumulator side by causing a valve seat to be attached thereto by a pushing force of a plunger spring, and thus acts to prevent high-pressure oil from flowing from the wheel cylinder to the accumulator.

On the other hand, during depressurization, a current flows through the valve by the on/off control to open a space between the plunger and the valve seat by overcoming a spring force by an electromagnetic force, and the high-pressure oil at the wheel cylinder side flows to the accumulator through the open flow path, and thus an action in which a high pressure formed at the wheel cylinder side is depressurized to release the brake is implemented.

However, an on/off type valve has a problem in that when characteristics are implemented as an on/off type while the wheel cylinder is depressurized, noise is generated during ABS control.

SUMMARY

Therefore, it is an aspect of the present disclosure to provide a technique for reducing noise generated by on/off control of a valve during anti-lock braking system (ABS) control.

Additional aspects of the disclosure will be set forth in part in the description which follows and, in part, will be obvious from the description, or may be learned by practice of the disclosure.

In accordance with one aspect of the present disclosure, in an electronic brake system including a pedal displacement sensor configured to sense displacement of a brake pedal according to a pedal effort of the brake pedal, a hydraulic pressure supply device configured to generate a hydraulic pressure using a rotational force of a motor operated by an electrical signal output from the pedal displacement sensor, and a hydraulic control unit configured to transmit a hydraulic pressure discharged from the hydraulic pressure supply device to wheel cylinders provided on respective wheels, the electronic brake system includes a plurality of valves configured to adjust the hydraulic pressures transmitted to the wheel cylinders, a pressure measurer configured to measure hydraulic pressures of the wheel cylinders and a hydraulic pressure of the hydraulic control unit, and a controller configured to control an electromagnetic force of the valve when a difference between the measured hydraulic pressure of the wheel cylinder and the measured hydraulic pressure of the hydraulic control unit is more than a preset first threshold value during an ABS operation.

The controller may perform position control of the motor to increase the hydraulic pressure of the hydraulic control unit.

The controller may release the control of the electromagnetic force of the valve when the motor reaches a target position and the difference between the measured hydraulic pressure of the wheel cylinder and the measured hydraulic pressure of the hydraulic control unit maintains a preset second threshold value.

The hydraulic pressure of the wheel cylinder may be increased by controlling the electromagnetic force of the valve.

In accordance with another aspect of the present disclosure, in an electronic brake system including a pedal displacement sensor configured to sense displacement of a brake pedal according to a pedal effort of the brake pedal, a hydraulic pressure supply device configured to generate a hydraulic pressure using a rotational force of a motor operated by an electrical signal output from the pedal displacement sensor, and a hydraulic control unit configured to transmit a hydraulic pressure discharged from the hydraulic pressure supply device to wheel cylinders provided on respective wheels, a control method of the electronic brake system includes adjusting the hydraulic pressures transmitted to the wheel cylinders based on a plurality of valves included in the hydraulic control unit during an ABS operation, measuring hydraulic pressures of the wheel cylinders and a hydraulic pressure of the hydraulic control unit, and controlling an electromagnetic force of the valve when a difference between the measured hydraulic pressure of the wheel cylinder and the measured hydraulic pressure of the hydraulic control unit is more than a preset first threshold value.

The control method may further include performing position control of the motor, increasing the hydraulic pressure of the hydraulic control unit through the position control of the motor, and determining whether the difference between the measured hydraulic pressure of the wheel cylinder and the measured hydraulic pressure of the hydraulic control unit is more than the preset first threshold value when the hydraulic pressure of the hydraulic control unit is increased.

The control method may further include releasing the control of the electromagnetic force of the valve when the motor reaches a target position and the difference between the measured hydraulic pressure of the wheel cylinder and the measured hydraulic pressure of the hydraulic control unit maintains a preset second threshold value.

The hydraulic pressure of the wheel cylinder may be increased through the control of the electromagnetic force of the valve.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
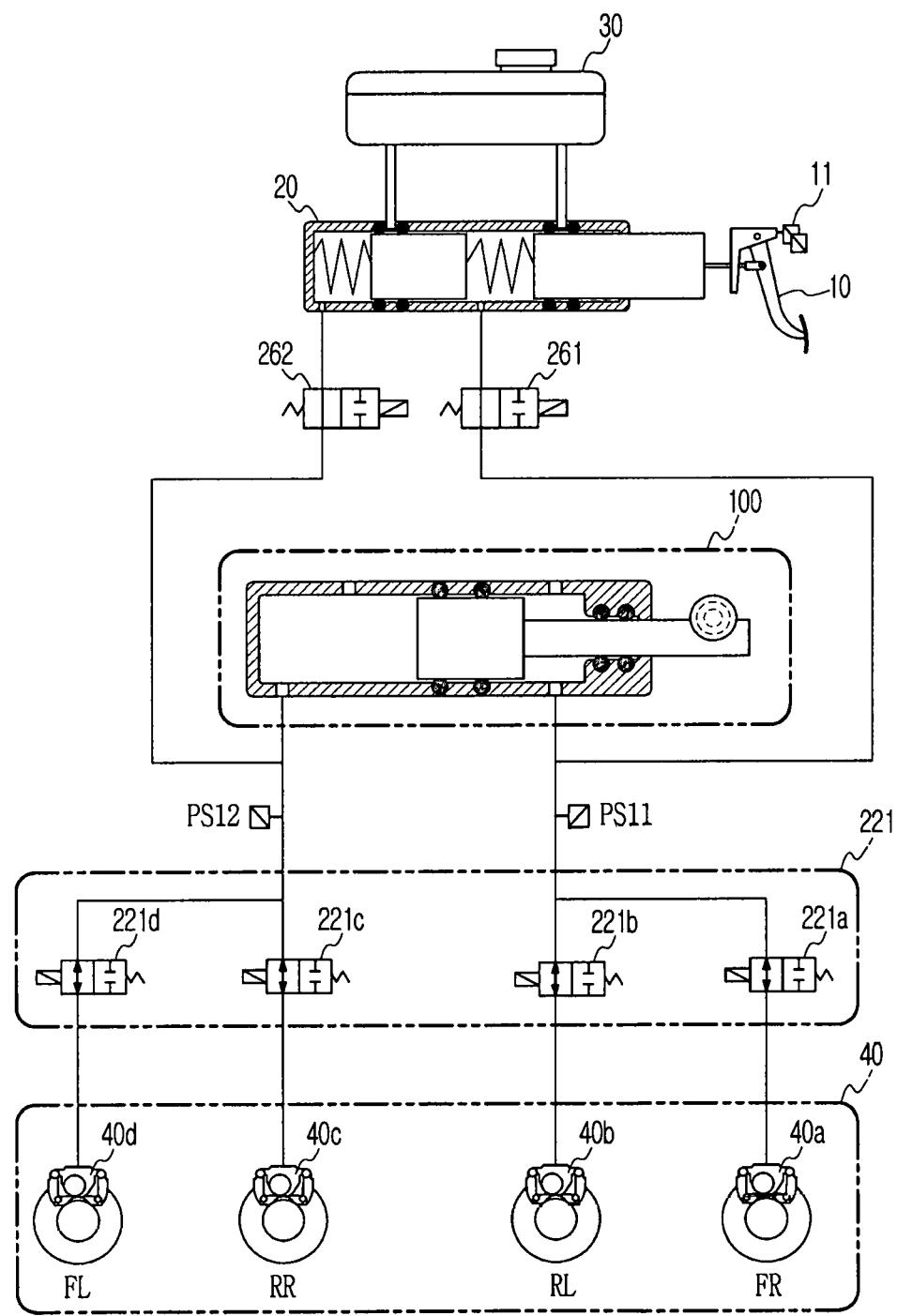
FIG. 1 is a schematic hydraulic circuit diagram of an electronic brake system according to an embodiment of the present disclosure.

Hereinafter, embodiments of the present disclosure will be described in detail with reference to the accompanying drawings. The following embodiments are provided to fully convey the spirit of the present disclosure to those skilled in the art. The present disclosure is not limited to the embodiments described herein but may be embodied in other forms. In the drawings, illustration of portions not related to description may be omitted in order to clarify the present disclosure, and sizes of components may be slightly exaggerated to help understanding of the present disclosure.

Figure 2:
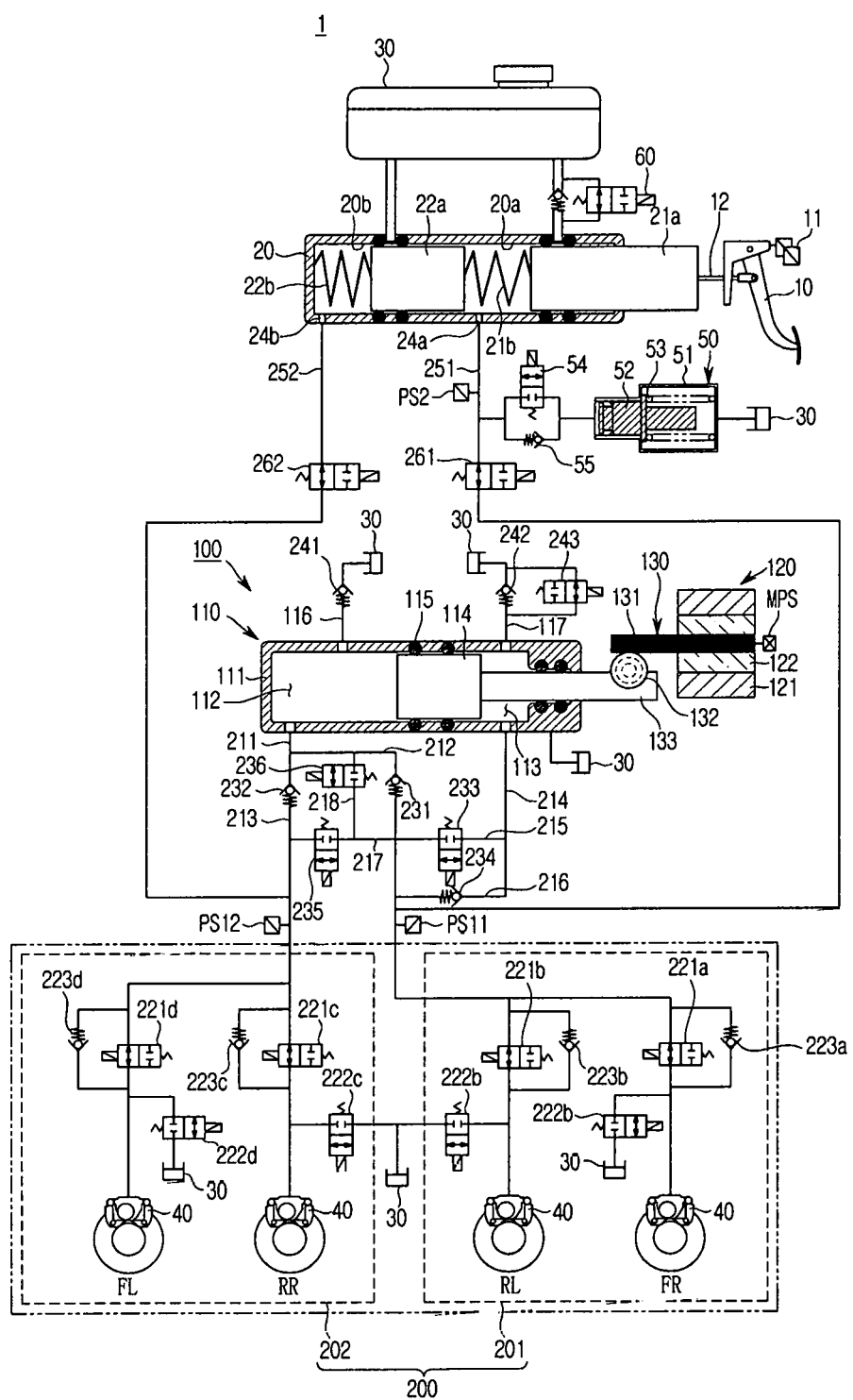
FIG. 2 is a hydraulic circuit diagram showing a state of the electronic brake system according to the embodiment of the present disclosure during non-braking.

FIG. 1 is a schematic hydraulic circuit diagram of an electronic brake system according to an embodiment of the present disclosure, and FIG. 2 is a hydraulic circuit diagram showing a state of the electronic brake system according to the embodiment of the present disclosure during non-braking.

Referring to FIG. 1, conventionally, an electronic brake system 1 includes a reservoir 30 for storing a brake hydraulic pressure, a brake pedal 10 for reflecting a driver's braking intention, and a pedal displacement sensor 11 for measuring a pedal effort of the brake pedal 10.

Further, the electronic brake system 1 includes a master cylinder 20 which generates a hydraulic pressure, wheel cylinders 40 to which the hydraulic pressure is transmitted and which perform braking of respective wheels RR, RL, FR, and FL, a hydraulic pressure supply device 100, which receives the driver's braking intention as an electrical signal from the pedal displacement sensor 11 for sensing displacement of the brake pedal 10 and mechanically operates, and inlet valves 221 (221a, 221b, 221c, and 221d), which adjust an amount of flow of a hydraulic pressure discharged from the hydraulic pressure supply device 100.

Further, the electronic brake system 1 includes first and second cut valves 261 and 262 for directly transmitting the hydraulic pressure from the master cylinder 20 when oil leakage occurs while the hydraulic pressure discharged from the hydraulic pressure supply device 100 is transmitted to each of the wheel cylinders 40. Generally, the first and second cut valves 261 and 262 may be provided as normally open type solenoid valves, which are operated to be open in a normal state and to be closed when a closing signal is received.

Therefore, when the first and second cut valves 261 and 262 are open, the hydraulic pressure provided from the master cylinder 20 may be supplied to the wheel cylinders 40 through first and second backup flow paths 251 and 252.

Specifically, the electronic brake system 1 of FIG. 1 may additionally include various valves, and FIG. 2 is a circuit diagram showing the electronic brake system 1 according to the embodiment of the present disclosure.

As shown in FIG. 2, the electronic brake system 1 according to the embodiment of the present disclosure includes the reservoir 30 which is coupled to an upper portion of the master cylinder 20 and stores oil therein, an input rod 12 which pressurizes the master cylinder 20 according to the pedal effort of the brake pedal 10, the wheel cylinders 40 to which the hydraulic pressure is transmitted and which perform braking of the respective wheels RR, RL, FR, and FL, the pedal displacement sensor 11 which senses the displacement of the brake pedal 10, and a simulation device 50 which provides a reaction force according to the pedal effort of the brake pedal 10.

The master cylinder 20 may include at least one chamber to generate a hydraulic pressure. For example, the master cylinder 20 may include a first master chamber 20a and a second master chamber 20b.

Referring to FIG. 1, the simulation device 50 includes a simulation chamber 51 provided to store oil discharged from a first hydraulic port 24a of the master cylinder 20, a pedal simulator including a reaction force piston 52 provided in the simulation chamber 51 and a reaction force spring 53 which elastically supports the reaction force piston 52, and a simulator valve 54 connected to a rear end of the simulation chamber 51.

The reaction force piston 52 and the reaction force spring 53 are provided to have a certain range of displacement in the simulation chamber 51 by oil introduced into the simulation chamber 51.

Meanwhile, the reaction force spring 53 shown in FIG. 2 is only one example capable of providing an elastic force to the reaction force piston 52, and may include various examples capable of storing an elastic force by shape deformation. For example, the reaction force spring 53 may be made of a material such as a rubber or the like, or may include various members capable of storing an elastic force by including a coil or plate shape.

The simulator valve 54 may be provided on a flow path which connects a rear end of the simulation chamber 51 and the reservoir 30. A front end of the simulation chamber 51 may be connected to the master cylinder 20, and the rear end of the simulation chamber 51 may be connected to the reservoir 30 through the simulator valve 54. Therefore, the oil of the reservoir 30 may be introduced into the simulation chamber 51 through the simulator valve 54 even when the reaction force piston 52 returns, so that the entire inside of the simulation chamber 51 may be filled with the oil.

Meanwhile, several reservoirs 30 are shown in the drawing, and the same reference numerals are used for the respective reservoirs 30. However, the reservoirs 30 may be provided with the same parts or may be provided with different parts. For example, a reservoir 30 connected to the simulation device 50 may be the same as a reservoir 30 connected to the master cylinder 20, or may be a reservoir capable of storing oil separately from the reservoir 30 connected to the master cylinder 20.

Meanwhile, the simulator valve 54 may be provided as a normally closed type solenoid valve which maintains a normally closed state. The simulator valve 54 may be open to transmit the oil in the simulation chamber 51 to the reservoir 30, when the driver applies a pedal effort to the brake pedal 10.

Further, a simulator check valve 55 may be provided between the pedal simulator and the reservoir 30 to be connected in parallel to the simulator valve 54. The simulator check valve 55 allows the oil in the reservoir 30 to flow into the simulation chamber 51, and may block the oil in the simulation chamber 51 from flowing to the reservoir 30 through a flow path on which the simulator check valve 55 is provided. Since the oil may be supplied into the simulation chamber 51 through the simulator check valve 55 when the pedal effort of the brake pedal 10 is released, a rapid return of a pressure of the pedal simulator may be ensured.

To describe an operation of the simulation device 50, when the driver provides a pedal effort to the brake pedal 10, the oil in the simulation chamber 51, which is pushed by the reaction force piston 52 of the pedal simulator while the reaction force piston 52 of the pedal simulator compresses the reaction force spring 53, is transmitted to the reservoir 30 through the simulator valve 54, and the driver is provided with a pedal feeling during this process. When the driver releases the pedal effort to the brake pedal 10, the reaction force piston 52 returns to an original state while the reaction force spring 53 pushes the reaction force piston 52, and the inside of the simulation chamber 51 may be fully filled with the oil while the oil in the reservoir 30 is introduced into the simulation chamber 51 through a flow path on which the simulator valve 54 is provided and the flow path on which the simulator check valve 55 is provided.

As described above, since the inside of the simulation chamber 51 is always filled with the oil, friction of the reaction force piston 52 may be minimized during the operation of the simulation device 50 so that durability of the simulation device 50 may be improved and introduction of foreign matter from the outside may be blocked.

The electronic brake system 1 according to the embodiment of the present disclosure may include the hydraulic pressure supply device 100, which receives the driver's braking intention as an electrical signal from the pedal displacement sensor 11 for sensing the displacement of the brake pedal 10 and mechanically operates, a hydraulic control unit 200 including first and second hydraulic circuits 201 and 202 each configured to control the flow of the hydraulic pressure transmitted to wheel cylinders 40 respectively provided on two wheels RR, RL, FR, and FL, a first cut valve 261, which is provided on a first backup flow path 251 for connecting the first hydraulic port 24*a* to the first hydraulic circuit 201 and controls the flow of the hydraulic pressure, a second cut valve 262, which is provided on a second backup flow path 252 for connecting a second hydraulic port 24*b* to the second hydraulic circuit 202 and controls the flow of the hydraulic pressure, and an electronic control unit (ECU) 1000 (in FIG. 3) which controls the hydraulic pressure supply device 100 and valves 54, 60, 221*a*, 221*b*, 221*c*, 221*d*, 222*a*, 222*b*, 222*c*, 222*d*, 233, 235, 236, and 243 based on hydraulic pressure information and pedal displacement information.

The hydraulic pressure supply device 100 may include a hydraulic pressure providing unit 110 which provides an oil pressure transmitted to the wheel cylinders 40, a motor 120 which generates a rotational force by the electrical signal of the pedal displacement sensor 11, and a power converter 130, which converts a rotational motion of the motor 120 into a linear motion and transmits the linear motion to the hydraulic pressure providing unit 110. Alternately, the hydraulic pressure providing unit 110 may be operated not by a driving force supplied from the motor 120 but by a pressure provided by a high pressure accumulator.

Next, flow paths 211, 212, 213, 214, 215, 216, and 217 and valves 231, 232, 233, 234, 235, 236, 241, 242, and 243, which are connected to a first pressure chamber 112 and a second pressure chamber 113, will be described.

A second hydraulic flow path 212 may communicate with the first hydraulic circuit 201 and a third hydraulic flow path 213 may communicate with the second hydraulic circuit 202. Therefore, the hydraulic pressure may be transmitted to the first hydraulic circuit 201 and the second hydraulic circuit 202 by forward movement of a hydraulic piston 114.

Further, the electronic brake system 1 according to the embodiment of the present disclosure may include a first control valve 231 and a second control valve 232, which are respectively provided on the second hydraulic flow path 212 and the third hydraulic flow path 213 to control the flow of the oil.

The first and second control valves 231 and 232 may be provided as check valves, which allow oil to flow only in a direction from the first pressure chamber 112 to the first or second hydraulic circuit 201 or 202 and block the oil from flowing in an opposite direction. That is, the first or second control valve 231 or 232 may allow a hydraulic pressure of the first pressure chamber 112 to be transmitted to the first or second hydraulic circuit 201 or 202, and may prevent the hydraulic pressure of the first or second hydraulic circuit 201 or 202 from leaking to the first pressure chamber 112 through the second or third hydraulic flow path 212 or 213.

Meanwhile, a fourth hydraulic flow path 214 may branch to a fifth hydraulic flow path 215 and a sixth hydraulic flow path 216 midway and may communicate with both the first hydraulic circuit 201 and the second hydraulic circuit 202. For example, the fifth hydraulic flow path 215 branched from the fourth hydraulic flow path 214 may communicate with the first hydraulic circuit 201, and the sixth hydraulic flow path 216 branched from the fourth hydraulic flow path 214 may communicate with the second hydraulic circuit 202. Therefore, the hydraulic pressure may be transmitted to both the first hydraulic circuit 201 and the second hydraulic circuit 202 by backward movement of the hydraulic piston 114.

Further, the electronic brake system 1 according to the embodiment of the present disclosure may include a third control valve 233 which is provided on the fifth hydraulic flow path 215 and controls the flow of the oil, and a fourth control valve 234 which is provided on the sixth hydraulic flow path 216 and controls the flow of the oil.

The third control valve 233 may be provided as a bidirectional control valve for controlling flow of oil between the second pressure chamber 113 and the first hydraulic circuit 201. Further, the third control valve 233 may be provided as a normally closed type solenoid valve, which is operated to be closed in a normal state and to be open when an opening signal is received from the ECU 1000.

The fourth control valve 234 may be provided as a check valve, which allows oil to flow only in a direction from the second pressure chamber 113 to the second hydraulic circuit 202 and blocks the oil from flowing in an opposite direction. That is, the fourth control valve 234 may prevent a hydraulic pressure of the second hydraulic circuit 202 from leaking to the second pressure chamber 113 through the sixth hydraulic flow path 216 and the fourth hydraulic flow path 214.

Further, the electronic brake system 1 according to the embodiment of the present disclosure may include a fifth control valve 235, which is provided on a seventh hydraulic flow path 217 for connecting the second hydraulic flow path 212 to the third hydraulic flow path 213 and controls the flow of the oil, and a sixth control valve 236, which is provided on an eighth hydraulic flow path 218 for connecting the second hydraulic flow path 212 to the seventh hydraulic flow path 217 and controls the flow of the oil. The fifth control valve 235 and the sixth control valve 236 may be provided as normally closed type solenoid valves, which are operated to be closed in a normal state and to be open when an opening signal is received from the ECU 1000.

The fifth control valve 235 and the sixth control valve 236 may be operated to be open when an abnormality occurs in the first control valve 231 or the second control valve 232 so that the hydraulic pressure of the first pressure chamber 112 may be transmitted to both the first hydraulic circuit 201 and the second hydraulic circuit 202.

The fifth control valve 235 and the sixth control valve 236 may be operated to be open when the hydraulic pressure of the wheel cylinder 40 leaks and is sent to the first pressure chamber 112. This is because the first control valve 231 and the second control valve 232, which are respectively provided on the second hydraulic flow path 212 and the third hydraulic flow path 213, are provided as check valves which allow oil flow only in one direction.

Further, the electronic brake system 1 according to the embodiment of the present disclosure may further include a first dump valve 241 and a second dump valve 242, which are respectively provided on first and second dump flow paths 116 and 117 and control the flow of the oil. The dump valves 241 and 242 may be check valves, which are open only in a direction from the reservoir 30 to the first or second pressure chamber 112 or 113 and are closed in an opposite direction. That is, the first dump valve 241 may be a check valve configured to allow oil to flow from the reservoir 30 to the first pressure chamber 112 and block the oil from flowing from the first pressure chamber 112 to the reservoir 30, and the second dump valve 242 may be a check valve configured to allow oil to flow from the reservoir 30 to the second pressure chamber 113 and block the oil from flowing from the second pressure chamber 113 to the reservoir 30.

Further, the second dump flow path 117 may include a bypass flow path, and a third dump valve 243 for controlling flow of oil between the second pressure chamber 113 and the reservoir 30 may be provided on the bypass flow path.

The third dump valve 243 may be provided as a solenoid valve capable of controlling a bidirectional flow of oil, and may be provided as a normally open type solenoid valve, which is operated to be open in a normal state and to be closed when a closing signal is received from the ECU 1000.

The hydraulic pressure providing unit 110 of the electronic brake system 1 according to the embodiment of the present disclosure may be operated in a double-acting form. That is, a hydraulic pressure, which is generated in the first pressure chamber 112 while the hydraulic piston 114 moves forward, may be transmitted to the first hydraulic circuit 201 through the first hydraulic flow path 211 and the second hydraulic flow path 212 to act the wheel cylinders 40 which are provided on the right front wheel FR and the left rear wheel RL, and may be transmitted to the second hydraulic circuit 202 through the first hydraulic flow path 211 and the third hydraulic flow path 213 to act the wheel cylinders 40 which are provided on the right rear wheel RR and the left front wheel FL.

In the same manner, a hydraulic pressure, which is generated in the second pressure chamber 113 while the hydraulic piston 114 moves backward, may be transmitted to the first hydraulic circuit 201 through the fourth hydraulic flow path 214 and the fifth hydraulic flow path 215 to act the wheel cylinders 40 which are provided on the right front wheel FR and the left rear wheel RL, and may be transmitted to the second hydraulic circuit 202 through the fourth hydraulic flow path 214 and the sixth hydraulic flow path 216 to act the wheel cylinders 40 which are provided on the right rear wheel RR and the left front wheel FL.

Further, a negative pressure, which is generated in the first pressure chamber 112 while the hydraulic piston 114 moves backward, may suck the oil of the wheel cylinders 40 provided on the right front wheel FR and the left rear wheel RL to transmit the oil to the first pressure chamber 112 through the first hydraulic circuit 201, the second hydraulic flow path 212, and the first hydraulic flow path 211, and may suck the oil of the wheel cylinders 40 provided on the right rear wheel RR and the left front wheel FL to transmit the oil to the first pressure chamber 112 through the second hydraulic circuit 202, the third hydraulic flow path 213, and the first hydraulic flow path 211.

Next, the motor 120 and the power converter 130 of the hydraulic pressure supply device 100 will be described.

The motor 120 is a device which generates a rotational force by a signal output from the ECU 1000, and may generate a rotational force in a forward or reverse direction. A rotational angular velocity and a rotational angle of the motor 120 may be precisely controlled. Since such a motor 120 is a well-known technology, a detailed description thereof will be omitted.

Meanwhile, the ECU 1000 controls the valves 54, 60, 221a, 221b, 221c, 221d, 222a, 222b, 222c, 222d, 233, 235, 236, and 243 provided in the electronic brake system 1 of the present disclosure to be described below, as well as the motor 120. An operation in which the plurality of valves are controlled according to the displacement of the brake pedal 10 will be described below.

A driving force of the motor 120 causes displacement of the hydraulic piston 114 through the power converter 130, and a hydraulic pressure, which is generated while the hydraulic piston 114 slides in the pressure chamber, is transmitted to the wheel cylinders 40 provided on the respective wheels RR, RL, FR, and FL through the first and second hydraulic flow paths 211 and 212.

The power converter 130 is a device which converts a rotational force into a linear motion and, for example, may include a worm shaft 131, a worm wheel 132, and a drive shaft 133.

The worm shaft 131 may be integrally formed with a rotational shaft of the motor 120, may have a worm formed on an outer circumferential surface thereof, and may be coupled to the worm wheel 132 to be engaged to rotate the worm wheel 132. The worm wheel 132 is connected to the drive shaft 133 to be engaged to linearly move the drive shaft 133, and the drive shaft 133 is connected to the hydraulic piston 114 to slide the hydraulic piston 114 in a cylinder block 111.

To describe again the above operations, a signal, which is sensed by the pedal displacement sensor 11 while displacement occurs in the brake pedal 10, is transmitted to the ECU 1000, and the ECU 1000 drives the motor 120 in one direction to rotate the worm shaft 131 in the one direction. A rotational force of the worm shaft 131 is transmitted to the drive shaft 133 via the worm wheel 132, and generates a hydraulic pressure in the first pressure chamber 112 while the hydraulic piston 114 connected to the drive shaft 133 moves forward.

Conversely, when the pedal effort is removed from the brake pedal 10, the ECU 1000 drives the motor 120 in an opposite direction to rotate the worm shaft 131 in the opposite direction. Therefore, the worm wheel 132 also rotates in the opposite direction, and generates a negative pressure in the first pressure chamber 112 while the hydraulic piston 114 connected to the drive shaft 133 returns (moves backward).

Meanwhile, the hydraulic pressure and the negative pressure may be generated in a direction opposite the above case. That is, the signal, which is sensed by the pedal displacement sensor 11 while the displacement occurs in the brake pedal 10, is transmitted to the ECU 1000, and the ECU 1000 drives the motor 120 in an opposite direction to rotate the worm shaft 131 in the opposite direction. A rotational force of the worm shaft 131 is transmitted to the drive shaft 133 via the worm wheel 132, and generates a hydraulic pressure in the second pressure chamber 113 while the hydraulic piston 114 connected to the drive shaft 133 move backward.

Conversely, when the pedal effort is removed from the brake pedal 10, the ECU 1000 drives the motor 120 in one direction to rotate the worm shaft 131 in the one direction. Therefore, the worm wheel 132 also rotates in the one direction, and generates a negative pressure in the second pressure chamber 113 while the hydraulic piston 114 connected to the drive shaft 133 returns (moves forward).

As described above, the hydraulic pressure supply device 100 may serve to transmit the hydraulic pressure to the wheel cylinders 40 or suck the hydraulic pressure to transmit the hydraulic pressure to the reservoir 30, according to rotational direction of the rotational force generated from the motor 120.

Meanwhile, when the motor 120 rotates in one direction, a hydraulic pressure is generated in the first pressure chamber 112 or a negative pressure is generated in the second pressure chamber 113. Whether braking is performed using the hydraulic pressure or the braking is released using the negative pressure may be determined by controlling the valves 54, 60, 221a, 221b, 221c, 221d, 222a, 222b, 222c, 222d, 233, 235, 236, and 243.

Although not shown in the drawing, the power converter 130 may be formed as a ball screw nut assembly. For example, the power converter 130 may include a screw, which is integrally formed with the rotational shaft of the motor 120 or is connected to be rotated along with the rotation shaft of the motor 120, and a ball nut, which is screw-engaged with the screw in a limited rotation state and linearly moves according to rotation of the screw. The hydraulic piston 114 is connected to the ball nut of the power converter 130 to pressurize the pressure chamber by the linear motion of the ball nut. Since a structure of such a ball screw nut assembly is a well-known technology as a device for converting a rotational motion into a linear motion, a detailed description thereof will be omitted.

It should be understood that the power converter 130 according to the embodiment of the present disclosure may adopt any structure as long as it can convert a rotational motion into a linear motion in addition to the structure of the ball screw nut assembly.

Further, the electronic brake system 1 according to the embodiment of the present disclosure may further include the first and second backup flow paths 251 and 252 capable of directly supplying oil discharged from the master cylinder 20 to the wheel cylinders 40 when the electronic brake system 1 is operated abnormally (in a fallback mode).

The first cut valve 261 which controls flow of oil may be provided on the first backup flow path 251, and the second cut valve 262 which controls the flow of the oil may be provided on the second backup flow path 252. Further, the first backup flow path 251 may connect the first hydraulic port 24a to the first hydraulic circuit 201, and the second backup flow path 252 may connect the second hydraulic port 24b to the second hydraulic circuit 202.

The first and second cut valves 261 and 262 may be provided as normally open type solenoid valves, which are operated to be open in a normal state and to be closed when a close signal is received from the ECU 1000.

The hydraulic control unit 200 may include the first hydraulic circuit 201 and the second hydraulic circuit 202, each of which receives the hydraulic pressure and controls two wheels. For example, the first hydraulic circuit 201 may control the right front wheel FR and the left rear wheel RL, and the second hydraulic circuit 202 may control the left front wheel FL and the right rear wheel RR. The wheel cylinders 40 are provided on the respective wheels FR, FL, RR, and RL to receive the hydraulic pressure so that braking is performed.

The first hydraulic circuit 201 is connected to the first hydraulic flow path 211 and the second hydraulic flow path 212 to receive the hydraulic pressure from the hydraulic pressure supply device 100, and the second hydraulic flow path 212 branches to two flow paths connected to the right front wheel FR and the left rear wheel RL. In the same manner, the second hydraulic circuit 202 is connected to the first hydraulic flow path 211 and the third hydraulic flow path 213 to receive the hydraulic pressure from the hydraulic pressure supply device 100, and the third hydraulic flow path 213 branches to two flow paths connected to the left front wheel FL and the right rear wheel RR.

The hydraulic circuits 201 and 202 may include a plurality of inlet valves 221 (221a, 221b, 221c, and 221d) to control flow of the hydraulic pressure. For example, two inlet valves 221a and 221b, which are connected to the first hydraulic flow path 211 and respectively control the hydraulic pressure transmitted to the two wheel cylinders 40, may be provided on the first hydraulic circuit 201. Further, two inlet valves 221c and 221d, which are connected to the second hydraulic flow path 212 and respectively control the hydraulic pressure transmitted to the wheel cylinders 40, may be provided on the second hydraulic circuit 202.

The inlet valve 221 may be provided as a normally open type solenoid valve, which is disposed at an upstream side from the wheel cylinder 40 and is operated to be open in a normal state and to be closed when a close signal is received from the ECU 1000.

Further, the hydraulic circuits 201 and 202 may include check valves 223a, 223b, 223c, and 223d provided on bypass flow paths which connect fronts and rears of the inlet valves 221a, 221b, 221c, and 221d. The check valves 223a, 223b, 223c, and 223d may be provided to allow flow of oil only in a direction from the wheel cylinders 40 to the hydraulic pressure providing unit 110 and to block the flow of the oil in a direction from the hydraulic pressure providing unit 110 to the wheel cylinders 40. The check valves 223a, 223b, 223c, and 223d may cause the braking pressure of the wheel cylinders 40 to be rapidly released, and may cause the hydraulic pressure of the wheel cylinders 40 to be introduced into the hydraulic pressure providing unit 110 when the inlet valves 221a, 221b, 221c, and 221d are not operated normally.

Further, the hydraulic circuits 201 and 202 may further include a plurality of outlet valves 222 (222a, 222b, 222c, and 222d) connected to the reservoir 30 in order to improve performance when the braking is released. The outlet valves 222 are respectively connected to the wheel cylinders 40 to control the hydraulic pressure to leak from the respective wheels RR, RL, FR, and FL. That is, the outlet valves 222 may sense the braking pressure of the respective wheels RR, RL, FR, and FL and control the pressure by selectively opening when pressure reduction braking is required.

The outlet valves 222 may be provided as normally closed type solenoid valves, which are operated to be closed in a normal state and to be open when an opening signal is received from the ECU 1000.

Further, the hydraulic control unit 200 may be connected to the backup flow paths 251 and 252. For example, the first hydraulic circuit 201 may be connected to the first backup flow path 251 to receive the hydraulic pressure from the master cylinder 20, and the second hydraulic circuit 202 may be connected to the second backup flow path 252 to receive the hydraulic pressure from the master cylinder 20.

In this case, the first backup flow path 251 may converge into the first hydraulic circuit 201 upstream from the first and second inlet valves 221a and 221b. In the same manner, the second backup flow path 252 may converge into the second hydraulic circuit 202 upstream from the third and fourth inlet valves 221c and 221d. Therefore, when the first and second cut valves 261 and 262 are closed, the hydraulic pressure provided by the hydraulic pressure supply device 100 may be supplied to the wheel cylinders 40 through the first and second hydraulic circuits 201 and 202, and when the first and second cut valves 261 and 262 are open, the hydraulic pressure provided by the master cylinder 20 may be supplied to the wheel cylinders 40 through the first and second backup flow paths 251 and 252. In this case, since the plurality of inlet valves 221a, 221b, 221c, and 221d are open, there is no need to switch an operation state.

Meanwhile, unexplained reference numeral "PS11" denotes a first hydraulic flow path pressure sensor for sensing the hydraulic pressure of the first hydraulic circuit 201, unexplained reference numeral "PS12" denotes a second hydraulic flow path pressure sensor for sensing the hydraulic pressure of the second hydraulic circuit 202, and unexplained reference numeral PS2" denotes a backup flow path pressure sensor for measuring the oil pressure of the master cylinder 20. Further, unexplained reference numeral "MPS" denotes a motor control sensor for controlling the rotational angle of the motor 120 or a current of the motor 120.

Hereinafter, an operation of the electronic brake system 1 according to the embodiment of the present disclosure will be described in detail.

The hydraulic pressure supply device 100 may be used by separating a low pressure mode and a high pressure mode. The low pressure mode and the high pressure mode may be changed by changing the operation of the hydraulic control unit 200. The hydraulic pressure supply device 100 may generate a high hydraulic pressure without increasing an output of the motor 120 by using the high pressure mode. Therefore, a stable braking force while lowering the price and weight of the brake system may be ensured.

More particularly, a hydraulic pressure is generated in the first pressure chamber 112 while the hydraulic piston 114 moves forward. As the hydraulic piston 114 moves forward in an initial state, that is, as a stroke of the hydraulic piston 114 increases, an amount of the oil transmitted from the first pressure chamber 112 to the wheel cylinder 40 increases and the braking pressure rises. However, since there is an effective stroke of the hydraulic piston 114, there is a maximum pressure due to the forward movement of the hydraulic piston 114.

In this case, a maximum pressure in the low pressure mode is smaller than a maximum pressure in the high pressure mode. However, a rate of increase in pressure per stroke of the hydraulic piston 114 in the high pressure mode is smaller as compared to that in the low pressure mode. This is because not all of the oil pushed out of the first pressure chamber 112 is introduced into the wheel cylinders 40 but some of the oil is introduced into the second pressure chamber 113.

Therefore, the low pressure mode in which a rate of increase in pressure per stroke is large may be used in an initial braking state in which braking response is important, and the high pressure mode in which a maximum pressure is large may be used in a late braking state in which a maximum braking force is important.

When braking by the driver starts, an amount of braking demand by the driver may be sensed by the pedal displacement sensor 11 through information such as a pressure of the brake pedal 10 depressed by the driver and the like. The ECU 1000 receives an electrical signal output from the pedal displacement sensor 11 to drive the motor 120.

Further, the ECU 1000 may receive a magnitude of an amount of regenerative braking through the backup flow path pressure sensor PS2 provided at an outlet side of the master cylinder 20 and the second hydraulic flow path pressure sensor PS12 provided on the second hydraulic circuit 202, and may calculate a magnitude of an amount of friction braking according to a difference between the amount of braking demand by the driver and the amount of regenerative braking to identify a magnitude of pressure increase or pressure decrease of the wheel cylinder 40.

Figure 3:
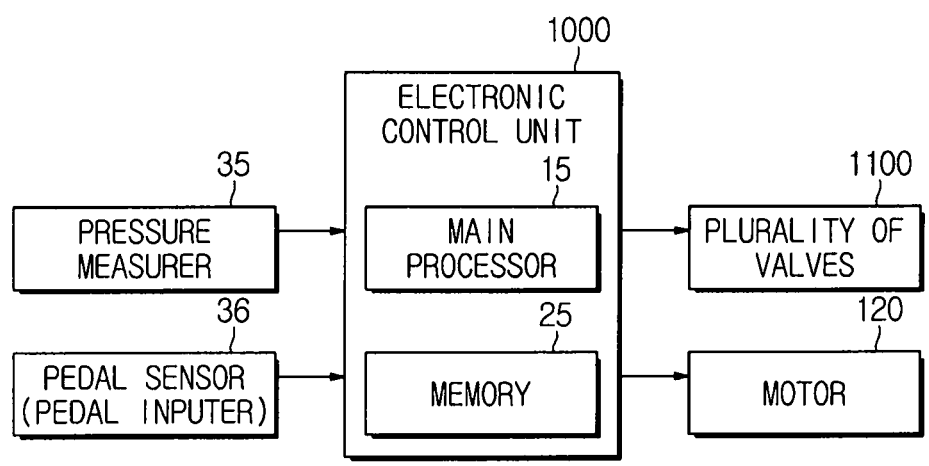
FIG. 3 is a schematic block diagram of an electronic brake system according to an embodiment of the present disclosure.

FIG. 3 is a schematic block diagram of an electronic brake system according to an embodiment of the present disclosure.

Specifically, referring to FIG. 3, an electronic brake system 1 of a vehicle includes a pressure measurer 35 for sensing a hydraulic pressure in a hydraulic system, a pedal inputer 36 for sensing a pedal input of a driver, an ECU 1000 for performing braking control, a plurality of valves 1100 in a hydraulic circuit, which are driven according to a control signal calculated in the ECU 1000, and a motor 120.

The pressure measurer 35 includes a plurality of pressure sensors. Specifically, the pressure measurer 35 may include pressure sensors (not shown) included in respective wheels FR, FL, RR, and RL, a first hydraulic flow path pressure sensor for sensing a hydraulic pressure of a first hydraulic circuit 201 with PS11 shown in FIGS. 1 to 4, a second hydraulic flow path pressure sensor for sensing a hydraulic pressure of a second hydraulic circuit 202 with PS12, and a backup flow path pressure sensor for measuring an oil pressure of a master cylinder 20 with PS2.

Therefore, pressures measured by the plurality of pressure sensors included in the pressure measurer 35 may be transmitted to the ECU 1000.

Next, the pedal inputer 36 senses the pedal input of the driver. Specifically, an amount of braking demand by the driver may be sensed by a pedal displacement sensor 11 shown in FIG. 1 through information such as a pressure of a brake pedal 10 depressed by the driver and the like.

Therefore, a pressure measured by the pedal displacement sensor 11 included in the pedal inputer 36 may be transmitted to the ECU 1000.

Next, the ECU 1000 collectively controls the electronic brake system 1 of the vehicle according to the present disclosure.

Therefore, the ECU 1000 according to the present disclosure may adjust a pressure of a wheel cylinder of each of wheels by performing position control of the motor 120 as well as by performing on/off control of the plurality of valves 1100 during an anti-lock braking system (ABS) operation.

Figure 4:
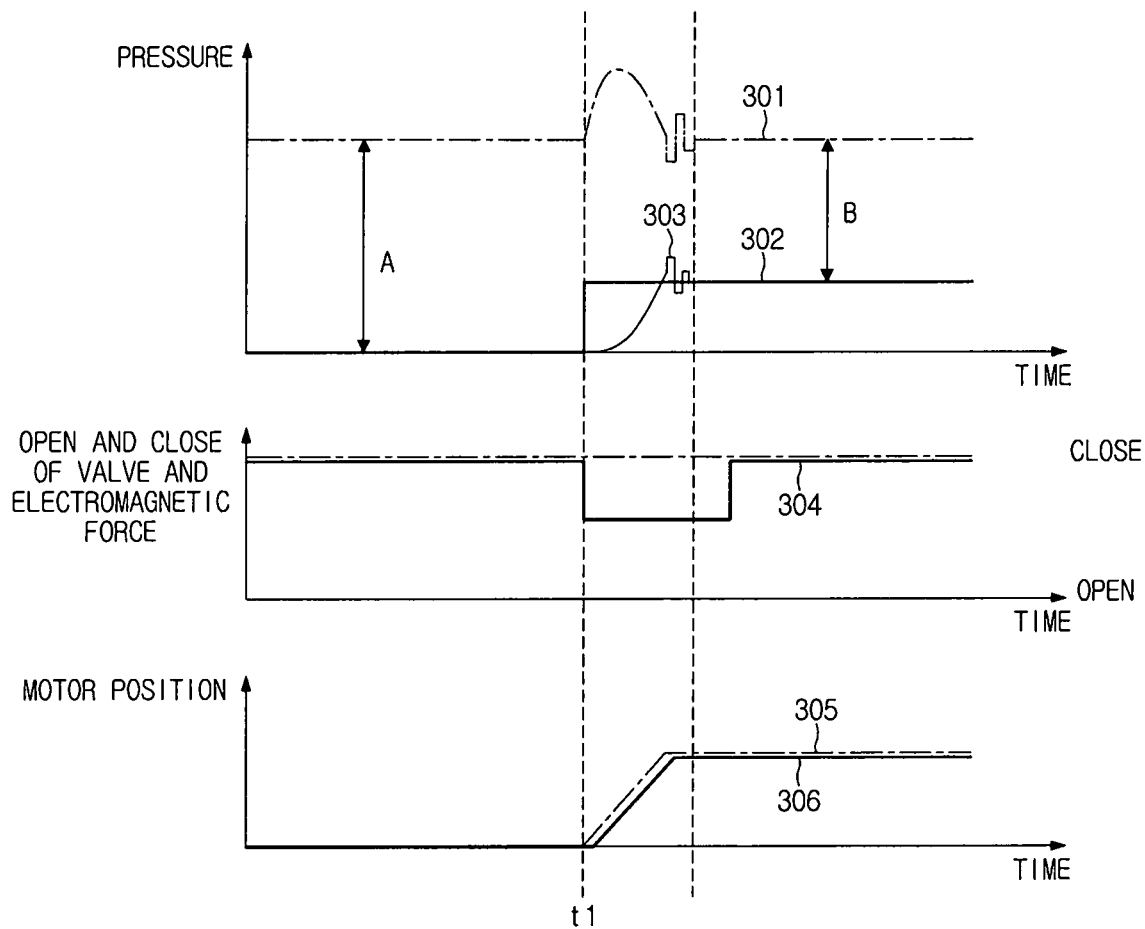
FIG. 4 is a graph showing a control method of an electronic brake system according to an embodiment of the present disclosure.

Specifically, FIG. 4 is a graph showing a pressure change due to an electromagnetic force control of the motor 120 and the plurality of valves 1100 of the ECU 1000 according to the present disclosure.

First, in a pressure graph over time, a dotted line 301 denotes a circuit pressure over time, a thick solid line 302 denotes a target wheel pressure, and a solid line 303 denotes a wheel pressure.

Next, in a graph showing on/off of an inlet valve 221 and an electromagnetic force of the inlet valve 221, a thick solid line 304 denotes an electromagnetic force of the inlet valve 221.

Finally, in a graph showing a motor position over time, a dotted line 305 denotes a target position of a motor, and a thick solid line 306 denotes an actual position of the motor.

When an ABS operation is performed, forward movement control of the motor 120 starts at a time point of t1 [sec]. In this case, in the forward movement control of the motor 120, the ECU 1000 may drive the motor 120 in one direction to rotate a worm shaft 131 in one direction, a rotational force of the worm shaft 131 may be transmitted to a drive shaft 133 via a worm wheel 132, and a hydraulic pressure may be generated in a pressure chamber 113 while a hydraulic piston 114 connected to the drive shaft 133 moves.

Therefore, when the circuit pressure 301 is increased through the forward movement control of the motor 120 and an error between the circuit pressure and the wheel pressure is more than a preset threshold value A due to the increase of the circuit pressure, the ECU 1000 performs control of the electromagnetic force of the inlet valve 221.

That is, the ECU 1000 reduces the electromagnetic force of the inlet valve 221 that has been closed and acts so that a high pressure formed on a wheel cylinder side does not flow to an accumulator side, and controls to gradually increase a hydraulic pressure 303 generated in each wheel until the hydraulic pressure 303 reaches a target hydraulic pressure 302. That is, an amount of the hydraulic pressure flowing through a plurality of inlet valves 221 may be adjusted through the control of the electromagnetic force.

In this case, when the motor reaches the target position 305 and a difference between a circuit pressure and a wheel pressure simultaneously with restoration of the circuit pressure 301 maintains at a preset threshold value B, the ECU 1000 releases the control of the electromagnetic force of the inlet valve 221. That is, the ECU 1000 may control so as to close the inlet valves to maintain the difference B between the circuit pressure and the wheel pressure.

Therefore, in the electronic brake system 1 according to the present disclosure, a flow velocity may be reduced through the control of the electromagnetic force of the inlet valve 221 during forward movement control of the motor of the ABC control as compared to a conventional electronic brake system, and thus noise of the wheel pressure may be reduced when an amount of flow is transmitted from the circuits to the wheels.

Next, a memory 25 in the ECU 1000 may include volatile memories such as a static random access memory (SRAM), a dynamic random access memory (DRAM), and the like, and non-volatile memories such as a flash memory, a read only memory (ROM), an erasable programmable read only memory (EPROM), an electrically erasable programmable read only memory (EEPROM), and the like.

The non-volatile memory may semi-permanently store control programs and control data for controlling the operation of the electronic brake system 1, and the volatile memory may read and temporarily store the control programs and the control data from the non-volatile memory and may temporarily store various sensor information and various control signals output from a main processor 15.

The configuration of the electronic brake system 1 according to the present disclosure has been described above.

Figure 5:
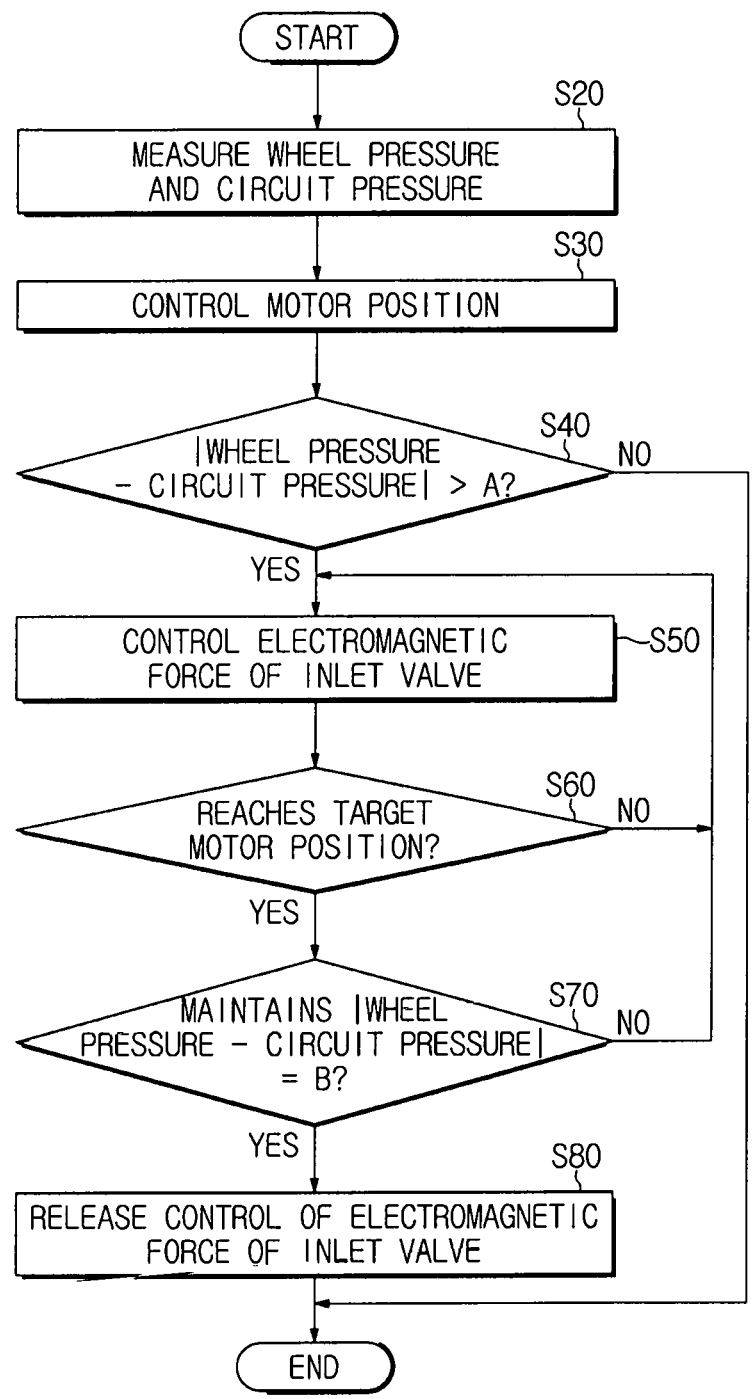
FIG. 5 is a flowchart showing a control method of an electronic brake system according to an embodiment of the present disclosure.

Hereinafter, FIG. 5 is a flowchart of a control method of the electronic brake system 1 according to the present disclosure.

The electronic brake system 1 measures a pressure of each of wheels and a pressure of a circuit (20).

Specifically, the pressure measurer 35 may include pressure sensors (not shown) included in respective wheels FR, FL, RR, and RL to measure a pressure of each of the wheels, PS11 shown in FIGS. 1 to 4 for sensing a hydraulic pressure of the first hydraulic circuit 201, PS12 for sensing a hydraulic pressure of the second hydraulic circuit 202, or PS2 for measuring an oil pressure of the master cylinder 20.

Further, as shown in FIG. 4, the ECU 1000 controls the motor 120 to move forward to a target position (30).

In this case, the electronic brake system 1 compares the measured pressure of the wheel and the measured pressure of the circuit (40). Specifically, the pressure of the wheel refers to a hydraulic pressure of the wheel cylinder measured by a pressure sensor of the pressure measurer 35, which is included in each of the wheels FR, FL, RR, and RL, and the pressure of the circuit refers to a hydraulic pressure of the first hydraulic circuit 201 measured by the PS11 and a hydraulic pressure of the second hydraulic circuit 202 measured by the PS12.

Therefore, when the circuit pressure 301 is increased through the forward movement control of the motor 120 and an error between the circuit pressure and the wheel pressure is more than a preset threshold value A due to the increase of the circuit pressure (YES in 40), control of the electromagnetic force of each of the plurality of inlet valves 221 connected to the respective wheel cylinders may be performed (50).

Specifically, the ECU 1000 reduces the electromagnetic force of each of the plurality of inlet valves 221 and acts so that a high pressure formed on a wheel cylinder side does not flow to an accumulator side, and controls to gradually increase the hydraulic pressure generated in each wheel. That is, an amount of a hydraulic pressure flowing through the plurality of inlet valves 221 may be adjusted through the control of the electromagnetic force.

Next, when a position of the motor 120 moves forward to the target position (YES in 60) and the hydraulic pressure generated in each wheel and the pressure of the circuit are maintained at a preset threshold value B (YES in 70), the control of the electromagnetic force of the inlet valve is released (80).

As is apparent from the above description, noise generated by on/off control of a valve during ABS control can be reduced.

While embodiments of the present disclosure have been shown and described, the present disclosure is not to be construed as limited to the particular embodiments described above, and it will be understood that various modifications may be made without departing from the spirit and scope of the present disclosure and such modifications are not individually understandable from the present disclosure.

What is claimed is:

1. An electronic brake system comprising:
    a pedal displacement sensor configured to sense displacement of a brake pedal according to a pedal effort of the brake pedal;
    a master cylinder including a first pressure chamber and a first hydraulic piston coupled to the brake pedal, and configured to generate a hydraulic pressure in the first pressure chamber caused by the pedal effort of the brake pedal;
    a hydraulic pressure supply device including a second pressure chamber and a second hydraulic piston coupled to a motor, and configured to generate a hydraulic pressure using a rotational force of the motor operated by an electrical signal output from the pedal displacement sensor;
    a hydraulic circuit configured to transmit a hydraulic pressure discharged from the hydraulic pressure supply device to a wheel cylinder disposed on at least one wheel;
    a valve configured to adjust the hydraulic pressure transmitted to the wheel cylinder;
    a pressure measurer configured to measure a hydraulic pressure of the hydraulic circuit; and
    a processor configured to adjust an electromagnetic force of the valve when a difference between a hydraulic pressure of the wheel cylinder and the measured hydraulic pressure of the hydraulic circuit is more than a first threshold value.

2. The electronic brake system according to claim 1, wherein, when the difference between the hydraulic pressure of the wheel cylinder and the measured hydraulic pressure of the hydraulic circuit is greater than the first threshold value, the processor increases the hydraulic pressure of the hydraulic circuit based on position control through a forward or backward movement of the motor.

3. The electronic brake system according to claim 2, wherein the processor controls the forward or backward movement of the motor to a target motor position.

4. The electronic brake system according to claim 3, wherein, when the motor reaches the target motor position and the difference between the hydraulic pressure of the wheel cylinder and the measured hydraulic pressure of the hydraulic circuit maintains a second threshold value smaller than the first threshold value, the processor closes the valve.

5. The electronic brake system according to claim 4, wherein the hydraulic pressure of the wheel cylinder is increased by controlling the electromagnetic force of the valve.

6. The electronic brake system according to claim 1, wherein, when target pressures of wheel cylinders disposed on respective wheels are individually set, the processor determines whether the difference between the hydraulic pressure of the wheel cylinder and the measured hydraulic pressure of the hydraulic circuit is more than the first threshold value.

7. The electronic brake system according to claim 6, wherein, when a maximum target pressure among the target pressures of the wheel cylinders disposed on the respective wheels is greater than the hydraulic pressure of the hydraulic circuit, the processor determines whether the difference between the hydraulic pressure of the wheel cylinder and the measured hydraulic pressure of the hydraulic circuit is more than the first threshold value.

8. A control method of an electronic brake system, the method comprising:
    generating, by a master cylinder including a first pressure chamber and a first hydraulic piston coupled to a brake pedal, a hydraulic pressure in the first pressure chamber caused by a pedal effort of the brake pedal;
    generating, by a hydraulic pressure supply device including a second pressure chamber and a second hydraulic piston coupled to a motor, a hydraulic pressure using a rotational force of the motor operated by an electrical signal output from a pedal displacement sensor;
    transmitting, by a hydraulic circuit, a hydraulic pressure discharged from the hydraulic pressure supply device to a wheel cylinder disposed on at least one wheel;
    measuring a hydraulic pressure of the hydraulic circuit; and
    controlling an electromagnetic force of a valve when a difference between a hydraulic pressure of the wheel cylinder and the measured hydraulic pressure of the hydraulic circuit is more than a preset first threshold value.

9. The control method according to claim 8, further comprising, when the difference between the hydraulic pressure of the wheel cylinder and the measured hydraulic pressure of the hydraulic circuit is greater than the first threshold value, increasing the hydraulic pressure of the hydraulic circuit based on position control through a forward or backward movement of the motor.

10. The control method according to claim 9, wherein the position control of the motor controls the forward or backward movement of the motor to a target motor position.

11. The control method according to claim 10, further comprising, when the motor reaches the target motor position and the difference between the hydraulic pressure of the wheel cylinder and the measured hydraulic pressure of the hydraulic circuit maintains a second threshold value smaller than the first threshold value, closing the valve.

12. The control method according to claim 11, wherein the hydraulic pressure of the wheel cylinder is increased by controlling the electromagnetic force of the valve.

13. The control method according to claim 8, wherein the controlling of the electromagnetic force of the valve includes:
    determining whether the difference between the hydraulic pressure of the wheel cylinder and the measured hydraulic pressure of the hydraulic circuit is more than the first threshold value when target pressures of wheel cylinders disposed on respective wheels are individually set; and controlling the electromagnetic force of the valve when it is determined that the difference between the hydraulic pressure of the wheel cylinder and the measured hydraulic pressure of the hydraulic circuit is more than the first threshold value.

14. The control method according to claim 13, wherein the determining of whether the difference between the hydraulic pressure of the wheel cylinder and the measured hydraulic pressure of the hydraulic circuit is more than the first threshold value includes determining whether the difference between the hydraulic pressure of the wheel cylinder and the measured hydraulic pressure of the hydraulic circuit is more than the first threshold value when a maximum target pressure among the target pressures of the wheel cylinders disposed on the respective wheels is greater than the hydraulic pressure of the hydraulic circuit.

* * * * *